United States Patent [19]

Kobayashi

[11] 4,225,573
[45] Sep. 30, 1980

[54] PROCESS FOR REDUCTIVE CALCINING OF MAGNESIUM SULFATE

[75] Inventor: Sadami Kobayashi, Sodegaura, Japan

[73] Assignee: Idemitsu Kosan Company Limited, Tokyo, Japan

[21] Appl. No.: 3,009

[22] Filed: Jan. 12, 1979

Related U.S. Application Data

[63] Continuation of Ser. No. 869,610, Jan. 16, 1978, abandoned.

[51] Int. Cl.³ .............................................. C01F 5/12
[52] U.S. Cl. ................................................... 423/638
[58] Field of Search .................... 423/541 R, 638, 244

[56] References Cited

U.S. PATENT DOCUMENTS 3,681,020   8/1972   Shah ..................................... 423/638

FOREIGN PATENT DOCUMENTS 764537  12/1956  United Kingdom ..................... 423/638

OTHER PUBLICATIONS

Martin et al., "Decomposition of Gypsum in a Fluidized-Bed Reactor", Bureau of Mines Report 6286, (1963), p. 7.

Primary Examiner—Earl C. Thomas
Assistant Examiner—Wayne A. Langel
Attorney, Agent, or Firm—Frishauf, Holtz, Goodman & Woodward

[57] ABSTRACT

A process for converting magnesium sulfate into magnesium oxide comprising calcining the magnesium sulfate in the presence of lignite coke or soot as a reducing agent.

9 Claims, 3 Drawing Figures

PROCESS FOR REDUCTIVE CALCINING OF MAGNESIUM SULFATE

This is a continuation of application Ser. No. 869,610, filed Jan. 16, 1978, now abandoned.

BACKGROUND OF THE INVENTION

1. Field of the Invention

This invention relates to a process for calcining magnesium sulfate in the presence of a reducing agent to convert it into magnesium oxide. More particularly, it is concerned with a process for the production of magnesium oxide at low temperatures and in high conversions by calcining magnesium sulfate in the presence of a specific reducing agent.

2. Description of the Prior Art

It is known to recover a sulfite gas contained in flue gas as magnesium sulfite by treating the flue gas with a slurry of magnesium hydroxide for desulfurization of the flue gas. This magnesium sulfite is pyrolyzed and re-used as magnesium oxide. The magnesium sulfite obtained at the step of desulfurization of flue gas contains magnesium sulfate as a by-product. In order to increase the economic efficiency of the process, therefore, it is necessary to convert the magnesium sulfate into magnesium oxide by pyrolysis.

The pyrolysis temperature of magnesium sulfate, however, is as high as about 1,000° C., which is quite high as compared with that of magnesium sulfite; i.e., about 600° C. At such high temperatures, magnesium oxide is excessively heated and cannot be re-used.

In order to solve the above problem, magnesium sulfite containing magnesium sulfate, obtained at the step of desulfurization of flue gas has hitherto been calcined at temperatures as high as 800° to 900° C. in the presence of petroleum coke as a reducing agent which is added to decrease the heat decomposition temperature of magnesium sulfate. This procedure, however, suffers from the disadvantage that the conversion of magnesium sulfate at low temperature zones is low, and it is still unsatisfactory. For example, a bench test shows that the conversion is less than 60% at calcining temperatures of lower than 800° C. In addition, there is a distribution of temperature in a furnace. Therefore, even though the operating temperature is set to 900° C., there are several zones in the furnace where the temperature is lower than 800° C. Thus, if it is intended to completely heat magnesium sulfate up to 800° C. at which the conversion of magnesium sulfate to be calcined is more than 60%, it is necessary to lengthen the residence time of the magnesium sulfate in the furnace. This leads to a reduction in the calcining efficiency.

SUMMARY OF THE INVENTION

An object of this invention is to provide a process for calcining magnesium sulfate to convert it into magnesium oxide.

Another object of this invention is to provide a process for the conversion of magnesium sulfate into magnesium oxide at low temperatures and in high yields.

A further object of this invention is to provide a process for calcining a slurry mixture of magnesium sulfite and magnesium sulfate, obtained at the step of desulfurization of flue gas to convert the magnesium sulfite and magnesium sulfate into magnesium oxide at low temperatures and in high yields.

Other objects and features of this invention will become apparent from the detailed description.

It has now been found that these objects are attained by calcining magnesium sulfate or a slurry mixture of magnesium sulfite and magnesium sulfate in the presence of lignite coke or soot as a reducing agent.

Thus this invention provides a process for converting magnesium sulfate into magnesium oxide which comprises calcining the magnesium sulfate in the presence of lignite coke or soot as a reducing agent.

DETAILED DESCRIPTION OF THE INVENTION

Figure 1:
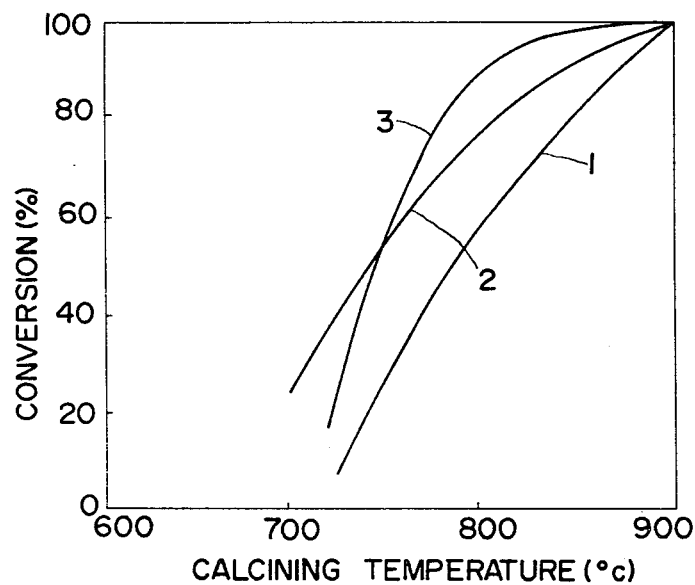
FIGS. 1 to 3 are graphs showing the relations between a calcining temperature and a conversion which are obtained by calcining magnesium sulfate in the presence of various reducing agents.

Lignite coke used in this invention as a reducing agent is available on the market, and those cokes having small particle sizes are preferred. Preferred lignite cokes are those having a particle size of less than 1,000$\mu$, and more preferred ones have a particle size of less than 500$\mu$.

Soots which can be used in this invention include soot contained in a combustion flue gas from a furnace, which is collected together by an electric dust collector, soot discharged out of a flue by sweeping, and the like. As a matter of course, carbon black on the market can be used. These soots have a particle size of less than about 100$\mu$, and they can thus be employed as they are.

These lignite cokes or soots are used in an amount of 5 to 50 parts by weight, preferably 10 to 40 parts by weight per 100 parts by weight of magnesium sulfate.

By the use of the above described specific reducing agents according to the method of this invention, a markedly high conversion of magnesium sulfate, especially at low temperature can be attained in case of processing a reductive calcination of the magnesium sulfate.

In effecting the method of this invention, the calcining temperature is set to 750° to 900° C. and the calcining time is sufficient to be about 10 to 60 minutes. As the calcining atmosphere, an inert or reductive atmosphere is employed because combustible carbonaceous materials are used as reducing agents. However, an incorporation of a small amount of oxidizing gasses into the reaction system is allowable.

The method of this invention can be applied to a heat-decomposition of magnesium sulfate into magnesium oxide, and a wide variety of processes including the above heat-decomposition. In particular, it is preferably applied to the calcining of a mixture containing magnesium sulfate and magnesium sulfite which is obtained at the step of desulfurization or desulfurization-denitrization of flue gas, etc. Such materials which are to be calcined, usually contain 10 to 20% by weight of magnesium sulfate. In this case, the amount of lignite coke or soot being added is 1 to 5 parts by weight, preferably 2 to 4 parts by weight per 100 parts by weight (dry weight) of the material to be calcined.

Where the method of this invention is employed in combination with the desulfurization of flue gas, the lignite coke or soot used as a reducing agent can be added either to a mixture of magnesium sulfate and magnesium sulfite in the dry state which is discharged out of a drying stove for desulfurization of flue gas, or to a mixture of magnesium sulfate and magnesium sulfite in the slurry state which is obtained at a step preceding the drying step. In general, flue gas is cooled in a cooling tower and then introduced into an absorbing tower filled with a slurry of magnesium hydroxide where a sulfite gas contained in the flue gas reacts with magnesium hydroxide to form a slurry of magnesium sulfite and magnesium sulfate. This slurry is introduced into a drying stove via a storing tank, a pH controlling tank, a separating tank, a centrifugal separator, and it is then fed to a calcining furnace where it is calcined.

In accordance with the method of the present invention, the above described reducing agent can be added to a slurry of the material to be calcined, at an appropriate point or points of the storing tank, pH controlling tank, and separating tank. On the other hand, where petroleum coke is added in accordance with the conventional procedures, it will inevitably float and separate from the slurry of the material to be calcined. This problem, however, is eliminated by the addition of soot according to the method of this invention since the soot is readily compatible.

The addition of the reducing agent can be conducted in either the dry state or the slurry state.

The method of this invention can be applied to a wide variety of mixtures of magnesium sulfite and magnesium sulfate which are obtained at the step of desulfurization or desulfurization-denitrization of flue gas, etc. In this case, while the amount of magnesium sulfate contained is not especially restrictive, it is usually 10 to 20% by weight.

In accordance with the method of this invention, the conversion of magnesium sulfate at low temperature is increased. Therefore, it is possible to shorten the residence time of the material to be calcined as compared with conventional procedures. As a result, the calcining efficiency is markedly enhanced.

The following examples are given by way of illustration only.

EXAMPLE 1

This example was conducted to make clear the effect of this invention.

To 8 grams of anhydrous magnesium sulfate were added 0.8 gram of various kinds of reducing agents. The resulting mixture was fully mixed and placed in a boat-like porcelain dish. This dish was then placed in an external heating type quartz tube while passing therethrough a mixed nitrogen gas of 94% $N_2$ and 6% $O_2$, or a nitrogen gas of 100% $N_2$, and it was calcined for 15 minutes. After the calcining, the dish was placed in a desiccator and cooled. Thereafter, the amount of the residual magnesium sulfate contained in the cooled calcined material was measured. The conversion was determined according to the following equation:

$$R_f = (S - R)/S \times 100$$

$R_f$: Conversion (%)
S: Amount of magnesium sulfate weighed out (g)
R: Amount of residual magnesium sulfate after calcination (g)

Figure 2:
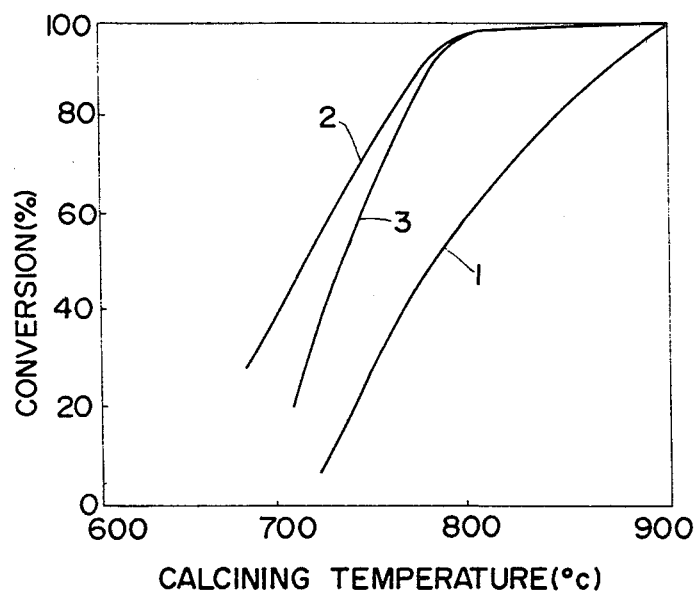

The results of the calcining tests are shown in FIGS. 1 and 2. The calcining atmospheres used in FIGS. 1 and 2 were respectively the mixed nitrogen gas of 94% $N_2$ and 6% $O_2$ and the nitrogen gas of 100% $N_2$. In these graphs, Curves 1, 2 and 3 indicate the results obtained by using respectively petroleum coke, boiler soot and lignite coke as reducing agents.

The properties of the reducing agents used above are shown below:

| Reducing | Particle | Composition (%) | | |
| Agent | Size (μ) | Carbon | Ash | Others |
|---|---|---|---|---|
| Petroleum Coke | less than 500 | 94.5 | 2.1 | 3.4 |
| Lignite Coke | less than 500 | 94.5 | 2.0 | 3.5 |
| Boiler Soot | less than 100 | 72.0 | 3.0 | 25.0 |

As can be seen from the graphs, the use of lignite coke and soot as reducing agents according to this invention increases markedly the conversion of magnesium sulfate into magnesium oxide in the calcination thereof. Thus, FIG. 1 reports that at 750° C. when using petroleum coke the percent conversion was less than 30%, whereas when using boiler soot or lignite coke, it was in the area of about 55–60%. When calcining was carried out at 850° C., the percent conversion using petroleum coke was about 80%, whereas when using boiler soot it was about 90% and when using lignite coke, it was about 98%. FIG. 2 reports the percent conversion for calcining at 750° C. for petroleum coke to be less than 30%, whereas when using boiler soot, it was about 70% and when using lignite coke, it was about 60%. When calcination was carried out at 850° C., when using petroleum coke the percent conversion was about 60%, and when using boiler soot or lignite coke the percent conversion was about 98%.

EXAMPLE 2

In this example, a powder having the following composition which had been discharged out of a drying stove during the desulfurization of flue gas was calcined.

| Composition | |
|---|---|
| $MgSO_3$ | 65% by weight |
| $MgSO_4$ | 12% by weight |
| $Mg(OH)_2$ | 7% by weight |
| Water of Crystallization | 9% by weight |
| Others | 7% by weight |

To 2.9 grams of the above powder was added 0.12 gram of the same boiler soot or petroleum coke as used in Example 1. The resulting mixture was fully mixed and placed in a boat-like procelain dish. This dish was placed in an external heating type quartz tube while passing therethrough a mixed gas of 84% $N_2$, 10% $CO_2$ and 6% $O_2$, and it was calcined for 15 minutes. After the calcination, the dish was placed in a desiccator and cooled. Thereafter, the amount of the residual magnesium sulfate contained in the cooled calcined material was measured, and its conversion was determined.

Figure 3:
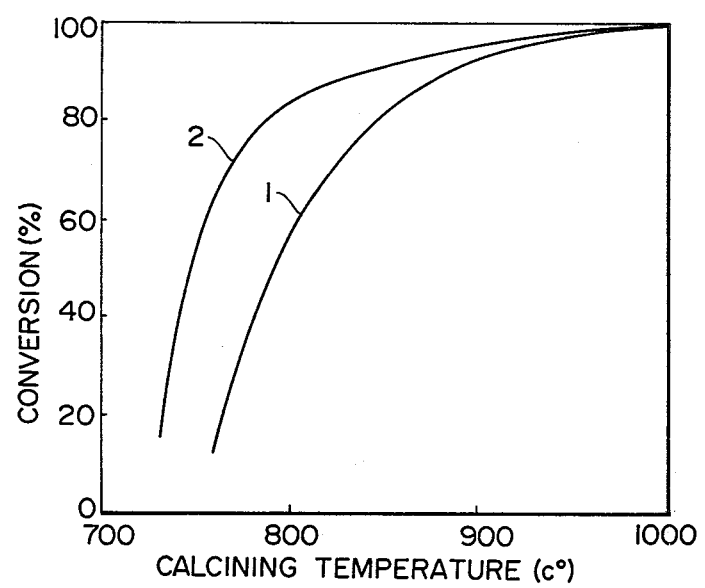

The results obtained are shown in FIG. 3. Curves 1 and 2 indicates respectively the results obtained by using petroleum coke and boiler soot as reducing agents. When calcination was carried out at 750° C., the percent conversion when using petroleum coke was so far less than 20% that it is not reported in the graph. When using boiler soot, the percent conversion was about 55%. When calcination was carried out at 850° C., the percent conversion using petroleum coke was about 80% whereas the percent conversion when using boiler soot was about 90%.

What is claimed:

1. A process for converting magnesium sulfate into magnesium oxide which comprises calcining the magnesium sulfate in the presence of lignite coke or soot as a reducing agent at a temperature of from 750° C. to 850° C.

2. The process according to claim 1, wherein the magensium sulfate is a mixture with magnesium sulfite.

3. The process according to claim 2, wherein the lignite coke or soot is added to a slurry of a mixture of magnesium sulfate and magnesium sulfite resulting from the desulfurization of flue gas.

4. The process according to claim 1, wherein the magnesium sulfate is calcined from about 10 to about 60 minutes.

5. The process according to claim 1, wherein the particle size of said lignite coke is less than 1000μ.

6. The process according to claim 1, wherein the particle size of said soot is less than about 100μ.

7. The process according to claim 1, wherein the amount of said lignite coke or soot is from about 5 to about 50 parts per weight per 100 parts by weight of the magnesium sulfate.

8. The process according to claim 1, wherein the amount of lignite coke or soot is from about 1 to about 5 parts by weight per 100 parts by weight of magnesium sulfate.

9. The process according to claim 1, wherein the magnesium sulfate is calcined in an inert atmosphere.

* * * * *